's Patent Office 2,864,804
Patented Dec. 16, 1958

2,864,804

HYDROXY-SUBSTITUTED ALLYLIC ETHERS AND DERIVATIVES

Edward C. Shokal, Walnut Creek, and Roy W. H. Tess, Orinda, Calif., assignors to Shell Development Company, New York, N. Y., a corporation of Delaware No Drawing. Application December 17, 1953
Serial No. 398,886

15 Claims. (Cl. 260—47)

This invention relates to a new class of ethers and to their preparation. More particularly, the invention relates to novel hydroxy allylic ethers, to their preparation from allylic alcohols and certain polyepoxides, and to valuable derivatives prepared from the hydroxy allylic ethers.

Specifically, the invention provides new and particularly useful hydroxy allylic ethers obtained by reacting a polyether polyepoxide, and particularly a glycidyl ether of a polyhydride phenol, with an allylic alcohol under such conditions that at least one, and preferably two or more, of the epoxy groups of the said polyether polyepoxide combine with a molecule of the allylic alcohol to form a $$-\underset{|}{\text{C}}\text{OH}\underset{|}{\text{C}}\text{HOR}$$

radical wherein R is an allylic radical. The invention further provides valuable derivatives of these hydroxy allylic ethers obtained by reacting the said ethers through the hydroxy groups and/or allylic group and/or residual epoxy groups, with other reactants, such as acids, unsaturated monomers, isocyanates, and the like.

As a special embodiment, the invention provides polyhydroxy polyallylic ethers obtained by reacting the polyether polyepoxide with at least a chemical equivalent amount of the allylic alcohol, and special alkyd-type resins obtained by reacting the polyhydroxy polyallylic ethers with polybasic acids or anhydrides, said alkyd resins having unexpected superior properties which make them of great value in the preparation of coating compositions.

It is an object of the invention to provide a new class of unsaturated ethers. It is a further object to provide new hydroxy allylic ethers and a method for their preparation. It is a further object to provide new hydroxy allylic ethers from polyether polyepoxides and allylic alcohols, having unusual properties which make them particularly useful and valuable in industry. It is a further object to provide novel hydroxy allylic ethers which are useful as plasticizers and stabilizers. It is a further object to provide novel hydroxy allylic ethers which may be polymerized to produce valuable polymeric products. It is a further object to provide polyhydroxy polyallylic ethers that may be used to produce valuable ester derivatives. It is a further object to provide new and improved alkyd resins prepared from polyhydroxy polyallylic ethers. It is a further object to provide new alkyd resins which give films having improved hardness and flexibility and excellent resistance to water. Other objects and advantages of the invention will be apparent from the following detailed description thereof.

It has now been discovered that these and other objects may be accomplished in part by the hydroxy allylic ethers of the invention which are obtained by reacting a polyether polyepoxide, and particularly a glycidyl ether of polyhydric phenol, with an allylic alcohol under such conditions that at least one, and preferably two or more, of the epoxy groups combine with a molecule of the allylic alcohol to form a $$-\underset{|}{\text{C}}\text{OH}\underset{|}{\text{C}}\text{HOR}$$

group wherein R is an allylic radical. It has been found that such compounds, due to their unique structural features, such as, for example, the presence of the aliphatic hydroxyl groups within two carbon atoms of the alkenoxy radicals, possess unobvious beneficial properties. These compounds have, for example, good solubility in solvents and oils and good compatibility with synthetic resins and may be used as stabilizers and plasticizers for compositions containing these materials. The ethers possessing residual epoxy groups are particularly useful as stabilizers for the halogen-containing polymers, such as poly (vinyl chloride). The hydroxy allylic ethers may also be polymerized by themselves or with other unsaturated materials to produce polymeric products having new and improved properties. The polyhydroxy-polyallylic ethers are particularly valuable as cross-linking agents and hardening agents for unsaturated materials, such as acrylic polymers, unsaturated alkyds and the like.

It has also been further discovered that the polyhydroxy polyallylic ethers of the invention may be reacted through the hydroxy group as with acids or anhydrides and isocyanates to produce new and useful products. The alkyd-type resins obtained by reacting the polyhydroxy polyallylic ethers, and particularly those derived from the glycidyl ethers of the polyhdric phenols, are particularly outstanding as they form cured films having good hardness and flexibility and improved resistance to water. Few alkyds have been found which give films having a combination of all of these properties.

The polyether polyepoxides to be used in preparing the novel ethers comprise those compounds which have at least two ether linkages, i. e., a —O— or —S— linkage, and a plurality of 1,2-epoxy groups (i. e.,

groups). These polyether polyepoxides may be saturated or unsaturated aliphatic, cycloaliphatic, aromatic or heterocyclic and may be substituted if desired with non-interfering substituents, such as halogen atoms, hydroxyl groups, ether radicals, and the like. They may also be monomeric or polymeric.

For clarity, many of the polyether polyepoxides and particularly those of the polymeric type will be described throughout the specification and claims in terms of an epoxy equivalency. The term "epoxy equivalency" as used herein refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyether polyepoxide material consists of a single compound and all of the epoxy groups are intact, the epoxy equivalency will be integers, such as 2,3,4, and the like. However, in the case of polymeric-type polyether polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5, and the like.

Polyether polyepoxides to be used in the process of the invention may be exemplified by 1,4-bis(2,3-epoxypropoxy)benzene, 1,3-bis(2,3-epoxypropoxy)benzene, 4,4'-bis(2,3-epoxypropoxy)diphenyl ether, 1,3-bis(2,3-epoxypropoxy)octane, 1,4-bis(2,3-epoxypropoxy)cyclohexane, 4,4' - bis(2 - hydroxy-3,4-epoxybutoxy)diphenyldimethylmethane, 1,3-bis(4,5-epoxypentoxy)-5-chlorobenzene, 1,4-bis(3,4 - epoxybutoxy)2 - chlorocyclohexane, diglycidyl ether, ethylene glycol diglycidyl ether, resorcinol diglycidyl ether, and, 1,2,3,4-tetra(2-hydroxy-3,4-epoxybutoxy) butane.

Other examples include the glycidyl polyethers of polyhydric phenols obtained by reacting a polyhydric phenol with an excess, e. g., 4 to 8 mole excess of chlorohydrin, such as epicholorohydrin and dichlorohydrin. Thus polyether A described hereinafter, which is substantially 2,2-bis(2,3-epoxypropoxyphenyl)propane, is obtained by reacting bis-phenol(2,2-bis(4'-hydroxyphenyl) propane) with an excess of epichlorohydrin in an alkaline medium. Other polyhydric phenols that can be used for this purpose include resorcinol, catechol, hydroquinone, methyl resorcinol, or polynuclear phenols, such as 2,2-bis (4-hydroxyphenyl)butane, 4,4'-dihydroxybenzophenone, bis(4-hydroxyphenyl)ethane, and 1,5-dihydronaphthalene.

Still a further group of the polyether polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. Polyhydric alcohols that may be used for this purpose include glycerol, propylene glycol, ethylene glycol, diethylene glycol, butylene glycol, hexanetriol, sorbitol, mannitol, pentanetriol, pentaerythritol, di- and tripentaerythritol, polyglycerol, dulcitol, inositol, carbohydrates, methyltrimethylolpropane, 2,6-octanediol, 1,2,4,5-tetrahydroxycyclohexane, 2-ethylhexanetriol-1,2,6, glycerol methyl ether, glycerol allyl ether, polyvinyl alcohol and polyallyl alcohol, and mixtures thereof.

Other polyether polyepoxides include the polyepoxpolyhydroxy polyethers obtained by reacting, preferably in an alkaline medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl) ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A group of polymeric-type polyether polyepoxides comprises the hydroxy-substituted polyepoxy polyethers obtained by reacting, preferably in an alkaline medium, a slight excess, e. g., .5 to 3 mole excess, of a halogen-containing epoxide, such as epichlorohydrin, with any of the aforedescribed polyhydric phenols, such as resorcinol, catechol, 2,2-bis(4'-hydroxyphenyl)propane, bis[4-(2'-hydroxynaphth-l-yl)-2-2-hydroxynaphth-l-yl] methane and the like.

Other polymeric polyether polyepoxides include the polymers and copolymers of the allylic ether of epoxy-containing alcohols. When this type of monomer is polymerized in the substantial absence of alkaline or acidic catalysts, such as in the presence of heat, oxygen, peroxy compounds, actinic light, and the like, they undergo additional polymerization at the multiple bond leaving the epoxy group unaffected. These allylic ethers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly(allyl 2,3-epoxypropyl ether), allyl 2,3-epoxypropyl ether-styrene copolymer, methallyl 3,4-epoxybutyl etherallyl benzoate copolymer, poly(vinyl 2,3-epoxypropyl)ether and an allyl glycidyl ether-vinyl acetate copolymer.

Preferred polyether polyepoxides are the monomeric and polymeric glycidyl polyethers of dihydric phenols obtained by reacting epichlorohydrin with a dihydric phenol in an alkaline medium. The monomeric products of this type may be represented by the general formula

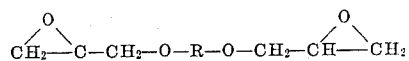

wherein R represents a divalent hydrocarbon radical of the dihydric phenol. The polymeric products will generally not be a single sample molecule but will be a complex mixture of glycidyl polyethers of the general formula

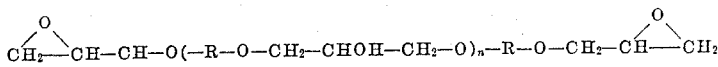

wherein R is a divalent hydrocarbon radical of the dihydric phenol and $n$ is an integer of the series 0, 1, 2, 3, etc., and preferably 0 to 5. While for any single molecule of the polyether $n$ is an integer, the fact that the obtained polyether is a mixture of compounds causes the determined value of $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of the dihydric phenols will be illustrated below.

PREPARATION OF GLYCIDYL POLYETHERS OF DIHYDRIC PHENOLS

*Polyether A.*—About 2 moles of bis-phenol was dissolved in 10 moles of epichlorohydrin and 1 to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g. and an epoxy equivalency of 1.75. For convenience, this product will be referred to hereinafter as Polyether A.

*Polyether B.*—A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature the product was an extremely viscous semi-solid having a melting point of 27° C. by Durrans' mercury method and a molecular weight of 483. The product had an epoxy value of 0.40 eq./100 g., and an epoxy equivalency of 1.9. For convenience, this product will be referred to as Polyether B.

*Polyether C.*—About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at 130° C. The Durrans' mercury method melting point of the resulting product is 52° C. and the molecular weight is about 710. The product has an epoxy value of 0.27 eq./100 g. and an epoxy equivalency of 1.9. For convenience, this product will be referred to as Polyether C.

Particularly preferred members of the above-described group are the glycidyl polyethers of the dihydric phenols, and especially 2,2-bis(4-hydroxyphenyl)propane, having an epoxy equivalency between 1.1 and 2.0 and a molecular weight between 300 and 900. Particularly preferred are those having a Durrans' mercury method softening point below about 60° C.

The glycidyl polyethers of polyhydric phenols obtained by condensing the polyhydric phenols with epichlorohydrin are also referred to as "ethoxyline" resins. See Chemical Week, vol. 69, page 27, for September 8, 1951.

Also preferred are the polyglycidyl polyethers of polyhydric alcohols obtained by reacting the polyhydric alcohol with epichlorohydrin, preferably in the presence of 0.1% to 5% by weight of an acid-acting compound, such as boron trifluoride, hydrofluoric acid, stannic chloride or stannic acid. This reaction is effected at about 50° C. to 125° C. with the proportions of reactants being such that there is about one mole of epichlorohydrin for every equivalent of hydroxyl group in the polyhydric alcohol. The resulting chlorohydrin ether is then dehydrochlorinated by heating at about 50° C. to 125° C. with a small, e. g., 10% stoichiometrical excess of a base, such as sodium aluminate.

The products obtained by the method shown in the preceding paragraph may be described as polyether polyepoxide reaction products which in general contain at least three non-cyclic ether (—O—) linkages, terminal epoxide-containing ether

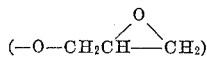

groups, and halogen attached to a carbon of an intermediate

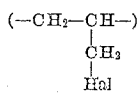

group.

These halogen-containing polyether polyepoxide reaction products obtainable by partial dehydrohalogenation of polyhalohydrin alcohols may be considered to have the following general formula

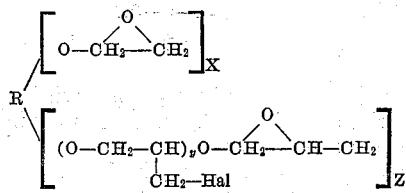

in which R is the residue of the polyhydric alcohol which may contain unreacted hydroxyl groups, X indicates one or more of the epoxy ether groups attached to the alcohol residue, $y$ may be one or may vary in different reaction products of the reaction mixture from zero to more than one, and Z is one or more, and $X+Z$, in the case of products derived from polyhydric alcohols containing three or more hydroxyl groups, averages around two or more so that the reaction product contains on the average two or more than two terminal epoxide groups per molecule.

The preparation of one of these preferred polyglycidyl ethers of polyhydric alcohols may be illustrated by the following example showing the preparation of a glycidyl polyether of glycerol.

PREPARATION OF GLYCIDYL POLYETHERS OF POLYHYDRIC ALCOHOLS

*Polyether D.*—About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerolepichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 200 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in dioxane solution. The epoxy equivalency of this product was 2.13. For convenience, this product will be referred to hereinafter as Polyether D.

Particularly preferred members of this group comprise the glycidyl polyethers of aliphatic polyhydric alcohols containing from 2 to 10 carbon atoms and having from 2 to 6 hydroxy groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

The allylic alcohols used in the preparation of the novel ethers are the beta, gamma-ethylenically unsaturated alcohols, such as allyl alcohol, methallyl alcohol, crotyl alcohol, tiglyl alcohol, 3-chloro-2-buten-1-ol, cinnamyl alcohol, 2,4-hexadien-1-ol, 2-methyl-2-hexen-1-ol, 5-chloro-2-octen-1-ol, 3-cyclohexyl-2-octen-1-ol, 4-phenyl-2-hepten-1-ol, 2,4-dichloro-2-hexen-1-ol, and 3-ethyl-2-octen-1-ol.

Preferred alcohols of this type are the beta, gamma-monoethylenically unsaturated monohydric alcohols and more particularly the chloro-2-alkenols and 2-alkenols containing no more than 8 carbon atoms, such as allyl alcohol, beta-chloroallyl alcohol, methallyl alcohol, ethallyl alcohol, 3-butyl-2-butenol and the like.

Coming under special consideration, particularly because of the superior properties of the resulting ethers, are those of the formula

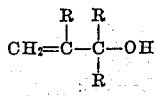

wherein R is a member of the group consisting of hydrogen, chlorine and aliphatic hydrocarbon radicals, especially the lower alkyl radicals.

The reaction between the allylic alcohols and the polyether polyepoxides is effected by merely combining the two reactants together, preferably in the presence of a catalyst, such as, for example, borontrifluoride, stannic chloride, sulfuric acid, phosphoric acid, perchloric acid, basic agents, such as caustic soda, pyridine, and materials such as active charcoal. Particularly preferred catalysts to be used for the reaction include the acid-acting fluorine-containing compounds, stannic halides and perchloric acid. Use of the stannic halides and the acid-acting fluorine compounds is described in U. S. Patent 2,260,753 and the use of the perchloric acid is described and claimed in copending application, Serial No. 358,977, filed July 1, 1953.

The amount of the catalyst employed will generally vary from about .01% to about 8% based on the weight of the reactants. With the preferred catalysts, such as stannic halides, fluorine compounds and the acid compounds, the amount of catalyst will preferably vary from about .01% to 5%, and more preferably from about .1% to 3%.

Temperatures employed in the process will vary over a wide range depending upon the presence of catalyst, type of reactants, etc. In general, temperatures varying from about 10° C. to 125° C. give satisfactory results. If catalysts are employed, such as the above-described acids, fluorine compounds, stannic chlorides, etc., it is preferred to carry out the reaction at the lower temperatures such as of the order of about 10° C. to 65° C. In the absence of catalysts, preferred temperatures range from about 50° C. to 125° C. The reaction may be conducted at atmospheric, superatmospheric or subatmospheric pressures as desired or necessary.

The proportions in which the allylic alcohol and the polyether polyepoxide are combined will vary over a wide range depending upon the type of product desired. If products having all of the epoxy groups converted to hydroxy-ether groups are desired, the polyether polyepoxide should be reacted with at least a chemical equivalent amount of the allylic alcohol. The expression "chemically equivalent" as used herein in reference to the polyepoxide polyether and unsaturated alcohol refers to the amount required to furnish one epoxide group for every hydroxyl group present in the allylic alcohol molecule. Preferably the polyepoxide and unsaturated alcohol are combined in chemically equivalent ratios varying from 1:1 to 1:4, and especially ratios varying from 1:1 to 1:2. If products having residual epoxide groups are desired, as is the case in some instances where subsequent reaction is desired through the epoxy groups, an equivalent of the polyether polyepoxide should, of course, be reacted with less than a chemically equivalent amount, such as .5 to .75 equivalent, of the allylic alcohol.

The reaction between the polyepoxide and allylic alcohol may be conducted in the presence or absence of solvents or diluents. The solvent, if employed, may be a solvent for the reactants and the resulting product or a solvent for the reactants and a non-solvent for the product. Suitable solvents include, among others, toluene, benzene dioxane, ethyl alcohol, tetrahydrofuran, methyl ether of ethylene glycol monoacetate, and the like, and mixtures thereof.

The course of the reaction may be followed by following the epoxide content. If completely esterified products are desired as indicated above, the reaction will be continued until the epoxide groups are no longer detected in the reaction mixture.

After the reaction is complete, the catalyst and solvent and excess alcohol may be removed by any suitable method. Thus, the catalyst may be removed by neutralization or filtration and the solvent and excess alcohol may be removed by distillation, preferably under reduced pressure.

The hydroxy allylic ethers of the invention will vary from viscous liquids to solids depending chiefly upon the polyether polyepoxide used in their preparation. The allylic ethers of the invention possess good slubility in oils and solvents and good compatibility with various synthetic resins and find use as plasticizers and stabilizers for compositions containing these materials.

The allylic ethers of the invention may also be polymerized by themselves or with other ethylenically unsaturated monomers to produce a variety of valuable polymeric products.

The monoallylic ethers of the invention may be homopolymerized or copolymerized with other monoethylenic compounds as disclosed below to produce thermoplastic polymers of a wide range of molecular weights which may be used as plasticizers, lubricating additives and the like. The polyallylic ethers may be homopolymerized to hard, insoluble, infusible castings. The polyallylic ethers may also be copolymerized with dissimilar unsaturated materials as disclosed below either in the role of cross-linking agents or to form polymers which have properties which are variations of the polymers of the polyallylic ethers. These ethers are particularly valuable as cross-linking or hardening agents for unsaturated alkyd resins and the like. Monomers that may be copolymerized with the products of the invention include those containing a $CH_2=C=$ group, such as styrene, alpha-methylstyrene, dichlorostyrene, and vinyl naphthalene; the alkyl esters of the mono- and polycarboxylic unsaturated acids as methyl acrylate, methyl methacrylate, butyl methacrylate and propyl acrylate, dimethyl maleate, dibutyl fumarate and dihexyl maleate; the alkenyl esters of the saturated monocarboxylic acids as allyl acetate, methallyl butyrate, vinyl benzoate, vinyl valerate and vinyl caproate; the vinylidene halides as vinylidene chloride and vinylidene fluoride; the vinyl halides as vinyl chloride and vinyl bromide; the vinyl esters of hydrocyanic acid as acylonitrile and methacryonitrile; the vinyl ethers as vinyl ethyl ether, vinyl butyl ether, allyl actyl ether, and the vinyl ketones such as vinyl butyl ketone, vinyl ethyl ketone, and the like. These dissimilar monomers are generally employed in amounts varying from .1% to 40% by weight, but in some cases may be employed in amounts varying up to about 80% by weight of the total reactants.

The polymerization may be effected by heating the hydroxy-substituted ethers or their derivatives along or with the other desired monomers in the presence of a free radical yielding catalyst, in bulk, solvent solution or in aqueous emulsion or suspension systems. Catalysts that may be used for the polymerization are preferably the peroxide catalysts, such as benzoyl peroxide, lauryl peroxide, tertiary butyl hydroperoxide, 2,2-di(tertiary butyl peroxy)butane, di(tertiary butyl) peroxide, tertiary butyl perlargonate, potassium persulfate, and the like. The amount of the catalyst added will preferably vary from about .1% to about 5% by weight of the reactants. Temperatures employed in the polymerization may vary over a considerable range but are preferably those within the range of about 65° C. and 250° C. Particularly preferred temperatures range from about 65° C. to 100° C. The polymerization may be conducted in the presence or absence of air. In some cases, it may be desirable to conduct the polymerization in the absence of air, such as in the presence of an inert gas, such as nitrogen.

The hydroxy-substituted allylic ethers of the present invention may also be further reacted through the hydroxyl groups and/or ethylenic linkages or residual epoxy groups to produce valuable derivatives. The hydroxy-substituted unsaturated ethers may, for example, be reacted with monocarboxylic acids, such as acetic acid, butyric acid, caproic acid, 2-ethylhexanoic acid, lauric acid, stearic acid, benzoic acid, cyclohexanoic acid, tert-butylbenzoic acid and isopropylbenzoic acid to produce ester derivatives which are valuable as plasticizers and lubricating oil additives.

The hydroxy-substituted allylic ethers may also be reacted with polyethylenically unsaturated monocarboxylic acids to produce products having value in the preparation of varnishes, pains and the like. Examples of such acids include rosin acids, as abietic acid, acids from linseed, soyabean, perilla, tung, walnut, dehydrated castor oil, as well as the lower fatty acids, such as pentadienoic acid, hexadienoic acid, and the like.

They hydroxy-substituted allylic ethers, and particularly those prepared by opening up at least two of the epoxide groups of the polyether polyepoxide to form at least two

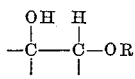

radicals, are outstanding, however, as polyols for the preparation of alkyd resins. As indicated above, it has been unexpectedly found that these hydroxy allylic ethers may be reacted with the polybasic acid or anhydrides alone or with various modifying agents to produce alkyds having outstanding properties, particularly as film-forming components for varnishes, enamels and the like. Polybasic acids or anhydrides that may be used to prepare these resins include, among others, aliphatic, cycloaliphatic and aromatic polybasic acids, such as oxalic acid, malonic acid, succinic acid, glutaric acid, adipic acid, sebacic acid, maleic acid, fumaric acid, phthalic acid, chlorophthalic acid, isophthalic acid, teraphthalic acid, tetrahydrophthalic acid, naphthalenedicarboxylic acid, diglycollic acid, dithioglycollic acid, dilatic acid, and their corresponding anhydrides. Particularly preferred acids for this purpose include the aliphatic and mononuclear aromatic dicarboxylic containing no more than 12 carbon atoms.

If desired, modified products may be obtained by adding various modifying agents, such as monocarboxylic acids, such as lactic acid, benzoic acid, chlorobenzoic acid, stearic acid, salicylic acid, mucic acid, sorbic acid, butyric acid, propionic acid, p-tert-butylbenzoic acid, 3,5-ditertiary butylbenzoic acid, acids derived from coconut, castor and cottonseed oil, and the like.

Alkyds having modified air-drying properties may also be prepared by employing unsaturated modifying agents, such as acids derived from drying oils as linseed, soyabean, perilla, tung, walnut and oiticica oil, and the monoglycerides of the fatty acids of these drying oils, such as the monoglycerides of linseed oil, monoglycerides of the fatty acids of soybean oil, and the like, as well as mixtures thereof.

The alkyd resins are preferably prepared by mixing the hydroxy allylic ether with the polybasic acid or anhydride and the desired modifying agent or agents and subjecting the resulting mixture to heat in an inert atmosphere. Ordinarily no catalyst need be employed to effect this reaction, but if desired substances, such as p-toluenesulfonic acid, zinc chloride, stannic chloride, calcium acetate, hydrochloric acid, etc., in amounts varying from 0.1% to 5% by weight of the reactants may be employed.

The proportions in which the allylic ether and the polybasic acid or anhydride are combined may vary over a considerable range depending upon the properties desired in the finished product. Ordinarily, the allylic ether and the acid component will be combined in chemically equivalent ratios varying from 1.5:1 to 1:1, and more preferably from 1.2:1 to 1:1. As used in this regard, the expression "chemically equivalent" amount refers to the amount needed to furnish one hydroxy group for every carboxyl group.

If modifying agents are employed, they are preferably utilized in amounts varying from about 5% to 70% depending on the type and product desired. Modifying agents such as the above-described monocarboxylic acids are preferably employed in amounts varying from about 5% to about 50% by weight of the alkyd.

The temperature employed during the resin-forming reaction may vary over a considerable range depending upon the type of reactants, catalyst, etc. In general, the temperature will range from about 100° C. to 300° C., and more preferably from 150° C. to 250° C. It is generally desirable to heat the mixture to the desired temperature slowly over a period of time, say, from 30 minutes to 1 hour.

The resin-forming reaction may be accomplished in the presence or absence of solvents or diluents. If solvents or diluents are employed, it is desirable to utilize inert organic compounds, such as benzene, toluene, xylene, cyclohexanone, chloroform, carbon tetrachloride, and the like.

As indicated above, the resin-forming reaction is conducted in an inert atmosphere. By an inert atmosphere is meant one substantially devoid of molecular oxygen, such as nitrogen, carbon dioxide and the like. Atmosphere, superatmospheric, or subatmospheric pressures may be used.

The water formed during the reaction may be removed during the said reaction or at its completion. It is preferably removed substantially as fast as it is formed therein. The removal of the water may be accomplished by any suitable means, such as azeotropic distillation with the diluents as toluene, and the like.

Since the alkyds are heat-convertible, care should be taken during the reaction to avoid converting the resin to a step beyond that of being fusible. This will occur if the reaction mixture is overheated or heated too long. To avoid such difficulty, the course of the reaction is conveniently followed by making determinations of the viscosity and acid number upon samples withdrawn from the reaction mass or by other well known methods. Ordinarily, the heating is continued until the viscosity has reached the desired value and the acid number has been reduced to a value between about 5 and 30.

When the reaction is substantially complete as shown by the above-described methods, the inert solvents may be removed or left in and more solvent added. Removal is conveniently accomplished by vacuum distillation, although fractional distillation, precipitation, and the like, may also be used.

The alkyds produced as described above will be recovered as very viscous liquids or soft solids to hard solids. While they may be used for a great many of the known applications of unsaturated alkyds, their most promising application appears as additives for coating compositions. In this application, they may be used by themselves or in combination with known film-forming components, such as synthetic or natural drying oils, amide-aldehyde-type resins, cellulose derivatives, vinyl polymers, and the like.

In the preparation of the coating compositions, the alkyds and, if desired, other film-forming materials, are combined together in a liquid vehicle which is usually employed in the preparation of such coatings, as ethyl acetate, isopropyl acetate, n-butyl acetate, methyl ethyl ketone, isobutyl ketone, ethylene glycol ethyl ether, xylene, toluene, n-butyl alcohol, various petroleum fractions, and the like, and mixtures thereof.

Other materials, such as plasticizers, as dibutyl phthalate, dioctyl phthalate, tricresyl phosphate, and the like, as well as additives, such as kopal, dammar and ester gum may also be added. If colored compositoins are desired, pigments and coloring materials, such as titanium pigments, may be incorporated in appropriate amounts.

The coating compositions containing the novel alkyds are superior in that they form films which, on curing, are very hard and flexible and have good resistance to water. The coating compositions may be applied to substantially any surface, such as, for example, steel or wood either primed or unprimed, by spraying, brushing or other desired methods. The coatings may be allowed to dry in air at normal temperatures or they may be baked by the application of infra-red rays or in a suitable oven. In the latter case, high temperatures may be used without discoloring or causing decomposition of the coating.

The above-described coating compositions may also be used to impregnate fabrics, glass fibers, and the like.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

*Example I*

This example illustrates the preparation of a hydroxy allylic ether by the reaction of allyl alcohol with Polyether A disclosed above.

About 1065 parts of Polyether A was placed in a glass reaction vessel and 1732 parts of allyl alcohol added thereto. The resulting mixture was then slowly heated to 65° C. and .5 part of BF$_3$ catalyst added. The mixture was stirred and maintained at 65° C. for 6 hours and then the excess allyl alcohol distilled off under reduced pressure (2.8 mm.). The resulting product was a viscous liquid which was essentially 2,2-bis(3'-allyloxy-2'-hydroxypropanoxy-4'-phenyl) propane

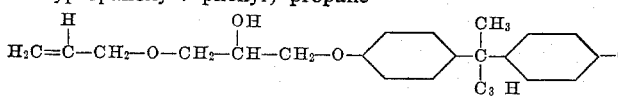

Hydroxy value 0.413 eq./100 g., epoxy value .001 eq./100 g.

*Example II*

This example illustrates the preparation and properties of an ester of the diallyl ether produced in Example I and dehydrated castor oil acids.

52.8 parts of the diallyl ether shown in Example I was combined with 47.2 parts of dehydrated castor oil acids (70% of theoretical amount) and 100 parts of xylene and the mixture heated at 250° C. in an atmosphere of nitrogen for several hours. The water of esterification formed during the reaction was removed by azeotropic distillation with the xylene. The resulting ester was a light colored soft solid. A solution made up of a hydrocarbon solvent containing a high proportion of aromatic hydrocarbons (B. P. 318–395° C. and aniline p. 17° F.) and the resulting ester had a Gardner color of 11–12, a viscosity of E. (Gardner scale), and an acid number on solids, 7.6 mg. KOH/g.

A solution of the above ester containing 0.05% cobalt was spread on tin panels and dried. The resulting films were hard and flexible and had good resistance to water.

*Example III*

This example illustrates the preparation and properties of an alkyd resin prepared from the diallyl ether produced in Example I and adipic acid.

175.3 parts of the diallyl ether was added to a Pyrex kettle with a stainless steel stirrer, nitrogen bubbler and thermometer well. 43.8 parts of adipic acid and xylene were added to the kettle and the mixture heated in an atmosphere of nitrogen upwards over a period of 1 hour to 230° C. and then maintained at that temperature for 2.5 hours. The water of esterification was removed by distillation with the xylene. A xylene solution of the resulting alkyd (47.9% solids) had a viscosity of X–Y, Gardner color of 7 and acid number on solids of 19.7.

Solutions of the above alkyd containing 0.15% cobalt drier dried in a short period to form hard flexible films having good resistance to water.

An alkyd having a lower acid number was obtained by employing 314.6 parts of the allyl ether and 73.1 parts of adipic acid in the above-described process.

*Example IV*

This example illustrates the preparation and properties of an alkyd resin prepared from the diallyl ether produced in Example I, adipic acid and a modifying agent consisting of p-tert-butylbenzoic acid.

175.3 parts of the diallyl ether was placed in the Pyrex kettle described in the above example. 35.1 parts of adipic acid, 21.4 parts of p-tert-butylbenzoic acid and 200 parts of xylene were then added and the mixture heated in an atmosphere of nitrogen upwards over 1 hour to 230° C. and held at that temperature for 5 hours. The water of esterification was removed by azeotropic distillation with the xylene. Xylene solution of the resulting alkyd (51.4% solids) had an acid number on solids of 18.8, viscosity of H and Gardner color of 8.

Films prepared from this alkyd dries to form very hard and tough coatings which had good flexibility and good resistance to water.

An alkyd having related properties was obtained by employing the reactants in the following proportions:

|  | Parts |
| --- | --- |
| Diallyl ether of Polyether A | 116.8 |
| Adipic acid | 29.2 |
| p-tert-Butylbenzoic acid | 17.8 |

*Example V*

This example illustrates the preparation and properties of another alkyd resin prepared from the allyl ether of

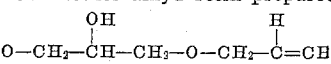

Polyether A produced in Example I and phthalic anhydride.

142 parts of the allyl ether was placed in the Pyrex kettle described in the above example. 36 parts of phthalic anhydride and 200 parts of xylene were then added and the mixture heated in an atmosphere of nitrogen upwards over 1 hour to 230° C. and held at that temperature for 5 hours. The xylene solution of the resulting alkyd (48.8% solids) had a viscosity of B, Gardner color of 7 and an acid number on solids of 25.

Films prepared from the alkyd dried to form very hard coatings.

*Example VI*

This example illustrates the preparation of a hydroxy allylic ether by the reaction of allyl alcohol with Polyether B described above.

About 1065 parts of Polyether B was placed in a Pyrex kettle and 1732 parts of allyl alcohol added thereto. The solution was then slowly heated to 65° C. and .5 part of BF$_3$ catalyst added. The mixture was stirred and maintained at 65° C. for 6 hours and then the excess allyl alcohol distilled off under reduced pressure (kettle temperature 115° C. 1.8 mm.). The resulting product was a soft solid having an epoxy value of .005 eq./100 g., a hydroxy value of 0.436 eq./100 g. and a chlorine content of 1.3%.

A polyhydroxy polyallylic ether having related properties is obtained by replacing Polyether B in the above process with an equivalent amount of Polyether C described above.

*Example VII*

This example illustrates the preparation of an alkyd resin from the allylic ether of Polyether B and adipic acid.

About 175 parts of the diallyl ether produced in the preceding example is added to a Pyrex kettle equipped with a stainless steel stirrer and thermometer well. 43.8 parts of adipic acid and 200 parts of xylene are added to the kettle and the mixture heated in an atmosphere of nitrogen upwards over a period of 1 hour to 230° C. and then maintained at that temperature for 5 hours.

Solutions of the alkyd produced in the above manner dried to form films which are very hard and flexible.

Similar results are obtained by replacing the adipic acid in the above-described process with equivalent amounts of each of the following: phthalic anhydride, succinic anhydride and isophthalic acid.

Example VIII

This example illustrates the preparation of a polymer from styrene and the adipic acid ester shown in Example III above.

80 parts of the adipic acid ester was added to xylene to form a 50% solution and this mixture then added to a flask equipped with stainless steel stirrer, reflux condenser, nitrogen bubbler and thermometer well and the mixture heated to 140° C. A solution of 0.2 part of di-tert-butyl peroxide in 10 parts of styrene was added to the refluxing solution over a period of 55 minutes. After heating an additional 10 minutes, the product was diluted with xylene and cooled. Analysis indicated that the final product contained 13% styrene. When cast upon plate glass, a clear film was obtained.

Example IX

This example illustrates the preparation of a cast polymer from styrene and the adipic acid ester shown in Example III above without the use of solvents.

8 parts of a mixture consisting of one-third styrene and two-thirds adipic acid ester was placed in a small plastic cup and 2% Lupersol ATC (commercial 50% benzoyl peroxide in tricresyl phosphate) was added and the mixture heated to 80° C. and maintained at that temperature for 5 hours. The product was a rubbery tough polymer. There was no significant change in the casting after being heated an additional 20 hours at 80° C.

The above process was repeated with the exception that 1% methyl ethyl ketone peroxide was used in place of the benzoyl peroxide and 0.06% cobalt naphthenate was added to the mixture. This mixture formed a firm tan-colored polymer after 66 hours at 25° C.

Example X

This example illustrates the preparation and properties of a hydroxy allylic ether prepared from allyl alcohol and Polyether E. Polyether E was prepared in the same manner as Polyether C described above with the exception that for each mole of bis-phenol there was employed 1.22 moles of epichlorohydrin and 1.37 moles of sodium hydroxide. The resulting product had a melting point of 98° C., a molecular weight of 1400 and an epoxide value of 0.103 eq./100 g.

About 75 parts of the Polyether E was mixed with 80 parts of allyl alcohol and .5 part of $SnCl_4$ and the mixture refluxed for several days. The resulting product was a soft slightly yellow solid. Films of a xylene solution of the solid dried rapidly in air to form a hard resistant coating.

Example XI

A hydroxy methallylic ether is obtained from Polyether D described above by reacting 1 mole of the polyether with approximately 3 moles of methallyl alcohol in the presence of 1 part of $SnCl_4$.

Example XII

A hydroxy allylic ether is obtained from a polymer of allyl glycidyl ether having a molecular weight of 481–542 and epoxy value of 0.5 eq./100 g. by reacting 542 parts of the polymer with 300 parts of allylic alcohol in the presence of the $BF_3$ ether catalyst. Films of a solution containing this ether dried to form hard resistant coating.

Example XIII

This example illustrates the preparation and properties of a monoallylic ether of Polyether A described above.

About 1050 parts of Polyether A described above are placed in a glass reaction vessel and 174 parts of alcohol and 200 parts of xylene added thereto. The resulting mixture is then slowly heated to 65° C. and 1 part of $BF_3$ catalyst added. The mixture was stirred and maintained at 65° C. for several hours and then the xylene and any excess allyl alcohol distilled off under reduced pressure. The resulting product is a viscous liquid which is essentially 2-epoxy-propoxyphenyl-2-(3'-allyloxy-2'-hydroxypropoxy-4''-phenyl)propane

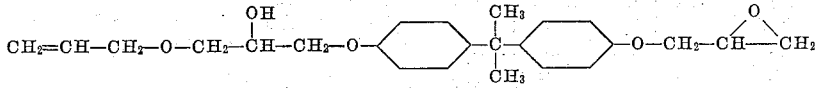

50 parts of the monoallyl ether produced above is combined with 60 parts of styrene and heated at 90° C. in the presence of benzoyl peroxide. The resulting product is a hard solid resin.

50 parts of the monoallyl ether produced above is combined with 50 parts of Polyether A and 5 parts of 2,4,6-tri(dimethyl aminomethyl)phenol and heated at 65° C. The resulting product which resulted from the polymerization through the epoxy group is a hard solid resin.

We claim as our invention:

1. Compounds of the group consisting of (1) hydroxy-substituted 2-alkenyl ethers of the formula

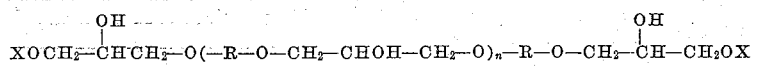

wherein R is a divalent radical obtained from a dihydric phenol by removing the hydrogen from the phenolic OH groups, n is an integer of the series 0 to 6 and one X is a 2-alkenyl radical and the other X is selected from the group consisting of 2-alkenyl radicals and the glycidyl radical, and (2) esters of the aforedescribed hydroxy-substituted 2-alkenyl ethers.

2. Compounds as defined in claim 1 wherein the 2-alkenyl radical contains up to 8 carbon atoms.

3. Compounds as defined in claim 1 wherein the 2-alkenyl radical is the allyl radical.

4. An addition polymer obtained by heating a compound defined in claim 1 in the presence of a free radical yielding catalyst.

5. An addition polymer obtained by heating the hydroxy-substituted 2-alkenyl ether defined in claim 15 with a dissimilar monomer having a $CH_2=C=$ group in the presence of a free radical yielding catalyst.

6. An addition polymer obtained by heating the hydroxy-substituted 2-alkenyl ether defined in claim 15 in the presence of a peroxide polymerization catalyst.

7. A hydroxy-substituted 2-alkenyl ether of the formula

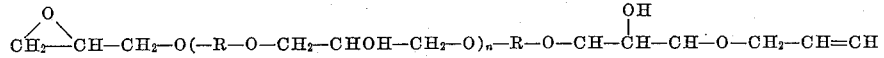

wherein R is a divalent radical obtained from a dihydric phenol by removing the hydrogen from the phenolic OH groups and n is an integer of the series from 0 to 6.

8. A hydroxy-substituted 2-alkenyl ether of the formula

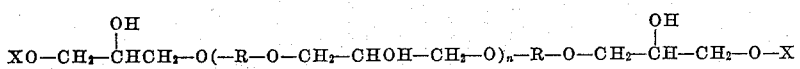

wherein R is a divalent radical obtained from a dihydric phenol by removing the hydrogen from the phenolic OH groups, $n$ is an integer of the series from 0 to 6, and X is a 2-alkenyl radical.

9. An ester of (1) a hydroxy-substituted 2-alkenyl ether of the formula

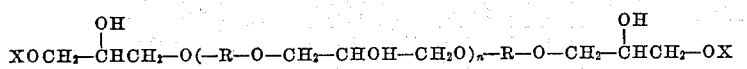

wherein R is a divalent hydrocarbon radical derived from a dihydric phenol by removing the hydrogen from the phenolic OH groups, $n$ is an integer of the series 0 to 6 and X is a 2-alkenyl radical containing no more than 8 carbon atoms, and (2) a carboxylic acid containing no more than 18 carbon atoms.

10. An alkyd resin comprising the heat reaction product of (1) a hydroxy-substituted 2-alkenyl ether of the formula

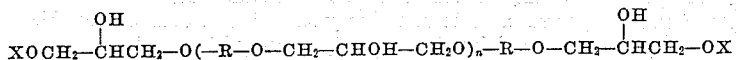

wherein R is a divalent hydrocarbon radical derived from a dihydric phenol by removing the hydrogen from the phenolic OH groups, $n$ is an integer of the series 0 to 6 and X is a 2-alkenyl radical containing no more than 8 carbon atoms, (2) a polybasic acid component of the group consisting of polybasic acids and anhydrides, and (3) a monocarboxylic acid, said hydroxy-substituted 2-alkenyl ether and polybasic acid component being employed in such quantities as to furnish from 1 to 1.5 hydroxyl groups per carboxyl group, and the monocarboxylic acid modifying agent being employed in amounts varying from 5% to 70% by weight of the alkyd resin modifying agent.

11. An alkyd resin as defined in claim 10 wherein the polybasic acid component is an aliphatic dicarboxylic acid containing no more than 12 carbon atoms.

12. An alkyd resin as defined in claim 10 wherein the monocarboxylic acid modifying agent is a member of the group consisting of saturated aliphatic and cycloaliphatic monocarboxylic acids and aromatic monocarboxylic acids.

13. An alkyd resin as defined in claim 10 wherein the acid component is phthalic anhydride.

14. An alkyd resin comprising the heat reaction product of a hydroxy 2-alkenyl ether defined in claim 15, adipic acid, and a tertiary alkyl-substituted aromatic monocarboxylic acid, the hydroxy 2-alkenyl ether and the adipic acid being employed in such quantities as to furnish from 1 to 1.5 hydroxyl groups per carboxyl group, and the tertiary alkyl-substituted aromatic monocarboxylic acid being employed in amounts varying from 5% to 70% by weight of the alkyd resin.

15. A hydroxy-substituted 2-alkenyl ether of the formula

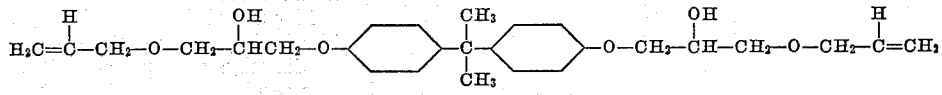

References Cited in the file of this patent

UNITED STATES PATENTS

| | | |
|---|---|---|
| 2,260,753 | Marple et al. | Oct. 28, 1941 |
| 2,581,464 | Zech | Jan. 8, 1952 |
| 2,618,616 | Tess et al. | Nov. 18, 1952 |
| 2,712,000 | Zech | June 28, 1955 |